US 9,117,291 B2

(12) United States Patent
Masumoto et al.

(10) Patent No.: US 9,117,291 B2
(45) Date of Patent: Aug. 25, 2015

(54) IMAGE PROCESSING APPARATUS, IMAGE PROCESSING METHOD, AND NON-TRANSITORY STORAGE MEDIUM (71) Applicant: FUJIFILM Corporation, Tokyo (JP)

(72) Inventors: Jun Masumoto, Tokyo (JP); Yuanzhong Li, Tokyo (JP); Yoshinori Itai, Tokyo (JP); Yasunori Ohta, Tokyo (JP); Yoshinao Fujimori, Tokyo (JP); Keigo Nakamura, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 141 days.

(21) Appl. No.: 13/865,055

(22) Filed: Apr. 17, 2013

(65) Prior Publication Data
US 2013/0279773 A1 Oct. 24, 2013

(30) Foreign Application Priority Data
Apr. 19, 2012 (JP) .................................. 2012-095776

(51) Int. Cl.
G06K 9/00 (2006.01)
G06T 5/40 (2006.01)
G06T 5/00 (2006.01)
G06T 5/50 (2006.01)

(52) U.S. Cl.
CPC . *G06T 5/40* (2013.01); *G06T 5/009* (2013.01); *G06T 5/50* (2013.01); *G06T 2207/10016* (2013.01); *G06T 2207/30004* (2013.01)

(58) Field of Classification Search
None
See application file for complete search history.

(56) References Cited

U.S. PATENT DOCUMENTS

| 2002/0168108 | A1* | 11/2002 | Loui et al. ..................... 382/190 |
| 2003/0095692 | A1 | 5/2003 | Mundy et al. |
| 2004/0114717 | A1 | 6/2004 | Kato |
| 2005/0259855 | A1* | 11/2005 | Dehmeshki ................... 382/131 |
| 2006/0098257 | A1* | 5/2006 | Kameyama ................... 358/537 |
| 2006/0126933 | A1* | 6/2006 | Porikli ......................... 382/173 |
| 2006/0170769 | A1* | 8/2006 | Zhou ............................ 348/143 |
| 2008/0044080 | A1 | 2/2008 | Li |
| 2008/0298658 | A1 | 12/2008 | Nakashima et al. |
| 2009/0323089 | A1* | 12/2009 | Hayasaki ....................... 358/1.9 |
| 2010/0328727 | A1* | 12/2010 | Ohara .......................... 358/3.01 |
| 2012/0134581 | A1* | 5/2012 | Matsuda ....................... 382/164 |

FOREIGN PATENT DOCUMENTS

| JP | 2004-57506 A | 2/2004 |
| JP | 2004-097331 A | 4/2004 |
| JP | 2007-307358 A | 11/2007 |
| JP | 2009-082561 A | 4/2009 |

OTHER PUBLICATIONS

Japanese Office Action dated May 13, 2014 corresponding to Japanese Patent Application No. 2012-095776 with English translation of relevant portion.

* cited by examiner

Primary Examiner — Hadi Akhavannik
(74) Attorney, Agent, or Firm — McGinn IP Law Group, Pllc (57) ABSTRACT A foreground statistic with respect to a distribution of image values in a foreground region and a background statistic with respect to a distribution of image values in a background region are calculated. Image values of a plurality of input images that are captured at different times are corrected based on the foreground statistics and the background statistics which are obtained by processing the input images.

19 Claims, 7 Drawing Sheets

IMAGE PROCESSING APPARATUS, IMAGE PROCESSING METHOD, AND NON-TRANSITORY STORAGE MEDIUM

CROSS-REFERENCE TO RELATED APPLICATION

This application is based upon and claims the benefit of priority from Japanese Patent Application No. 2012-095776 filed on Apr. 19, 2012, the contents of which are incorporated herein by reference.

BACKGROUND OF THE INVENTION

1. Field of the Invention

The present invention relates to an image processing apparatus, an image processing method, and a non-transitory storage medium.

2. Description of the Related Art

In the medical field, there have recently been proposed various image processing technologies for making images captured and acquired under different conditions look substantially in the same manner for higher repeatability of image diagnosis.

Japanese Laid-Open Patent Publication No. 2004-097331 discloses a method of and an apparatus for generating feature quantities (e.g., a histogram) of a target area and normalizing the density distribution of an image based on the relationship between the generated feature quantities and reference feature quantities (hereinafter referred to as "reference data"). The publication states that the density distributions which are different depending on apparatus types or settings can be approximated to a method and apparatus.

SUMMARY OF THE INVENTION

In a case where a cross-sectional image of a region is captured, the shape and position of the region in the captured cross-sectional image vary depending on the combination of the cross-sectional direction (axial, etc.) and the cross-sectional position. In other words, density distributions suitable for respective cross-sectional images are different depending on image processing conditions (image reconstructing conditions).

According to the method disclosed in Japanese Laid-Open Patent Publication No. 2004-097331, it is necessary to prepare in advance reference data depending on the combinations of cross-sectional directions and cross-sectional positions. It is highly troublesome to manage such reference data. The reference data are required also in comparing a plurality of input images that are captured at different times, i.e., a plurality of temporal images.

It is an object of the present invention to provide an image processing apparatus, an image processing method, and a non-transitory storage medium which make it possible to easily adjust how a plurality of input images captured at different times look without the need for the preparation of data for adjusting density distributions with respect to each of image processing conditions.

According to the present invention, there is provided an image processing apparatus comprising a region extractor for extracting a foreground region and a background region that do not overlap each other, from within an input image of a plurality of input images captured at different times, a statistics calculator for calculating a foreground statistic, which is a statistic with respect to a distribution of image values in the foreground region extracted by the region extractor, and a background statistic, which is a statistic with respect to a distribution of image values in the background region extracted by the region extractor, and an image corrector for correcting image values of the input images based on the foreground statistics and the background statistics which are obtained by processing the input images sequentially with the region extractor and the statistics calculator.

The image processing apparatus includes the statistics calculator that calculates a foreground statistic with respect to a distribution of image values in the foreground region and a background statistic with respect to a distribution of image values in the background region, and the image corrector that corrects image values of the input images that are captured at different times, based on the foreground statistics and the background statistics which are obtained by processing the input images successively with the region extractor and the statistics calculator. Thus, the image processing apparatus makes it possible to easily adjust how a plurality of input images that are captured at different times look and appear, without the need for the preparation of data for adjusting density distributions for each image processing condition.

The image corrector should preferably correct image values of the input images such that the standard deviation with respect to a distribution of differences of the image values between the input images is reduced after the image values have been corrected. The input images can thus be made to look and appear similarly to each other.

The image corrector should preferably correct image values of the input images by preprocessing at least one of the input images.

The image corrector should preferably correct image values of the input images by determining a display protocol for at least one of the input images.

The region extractor should preferably extract the foreground region and the background region from a common area which is commonly included in the input images.

The region extractor should preferably extract an annular region surrounding the foreground region as the background region. Since the region extractor extracts an isotropically-shaped background region, the background region is of a constant shape regardless of the anisotropy and orientation of the foreground region, and allows the background statistic to be calculated stably.

The statistics calculator should preferably calculate a statistic which represents any one of a mean value, a mode value, a median value, a maximum value and a minimum value, as at least one of the foreground statistic and the background statistic.

The image values should preferably each comprise a voxel value, and the region extractor should preferably extract the foreground region and the background region that are each a three-dimensional image region.

According to the present invention, there is also provided an image processing method for enabling an image processing apparatus to perform an extracting step of extracting a foreground region and a background region that do not overlap each other, from within an input image of a plurality of input images captured at different times, a calculating step of calculating a foreground statistic, which is a statistic with respect to a distribution of image values in the extracted foreground region, and a background statistic, which is a statistic with respect to a distribution of image values in the extracted background region, and a correcting step of correcting image values of the input images based on the foreground statistics and the background statistics which are obtained by subjecting the input images sequentially to the extracting step and the calculating step.

According to the present invention, there is further provided a non-transitory storage medium storing therein a program for enabling an image processing apparatus to perform an extracting step of extracting a foreground region and a background region that do not overlap each other, from within an input image of a plurality of input images captured at different times, a calculating step of calculating a foreground statistic with respect to a distribution of image values in the extracted foreground region, and a background statistic, which is a statistic with respect to a distribution of image values in the extracted background region, and a correcting step of correcting image values of the input images based on the foreground statistics and the background statistics which are obtained by subjecting the input images sequentially to the extracting step and the calculating step.

With the image processing apparatus, the image processing method, and the non-transitory storage medium according to the present invention, a foreground statistic with respect to a distribution of image values in a foreground region and a background statistic with respect to a distribution of image values in a background region are calculated, and image values of a plurality of input images that are captured at different times are corrected based on the foreground statistics and the background statistics which are obtained by processing the input images. Therefore, it is possible to easily adjust how a plurality of input images that are captured at different times look, without the need for the preparation of data for adjusting density distributions for each image processing condition.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An image processing method according to a preferred embodiment of the present invention in relation to an image processing apparatus and a program (storage medium) for carrying out the image processing method will be described below with reference to the accompanying drawings.

[Configuration of Image Processing Apparatus 10]

Figure 1:
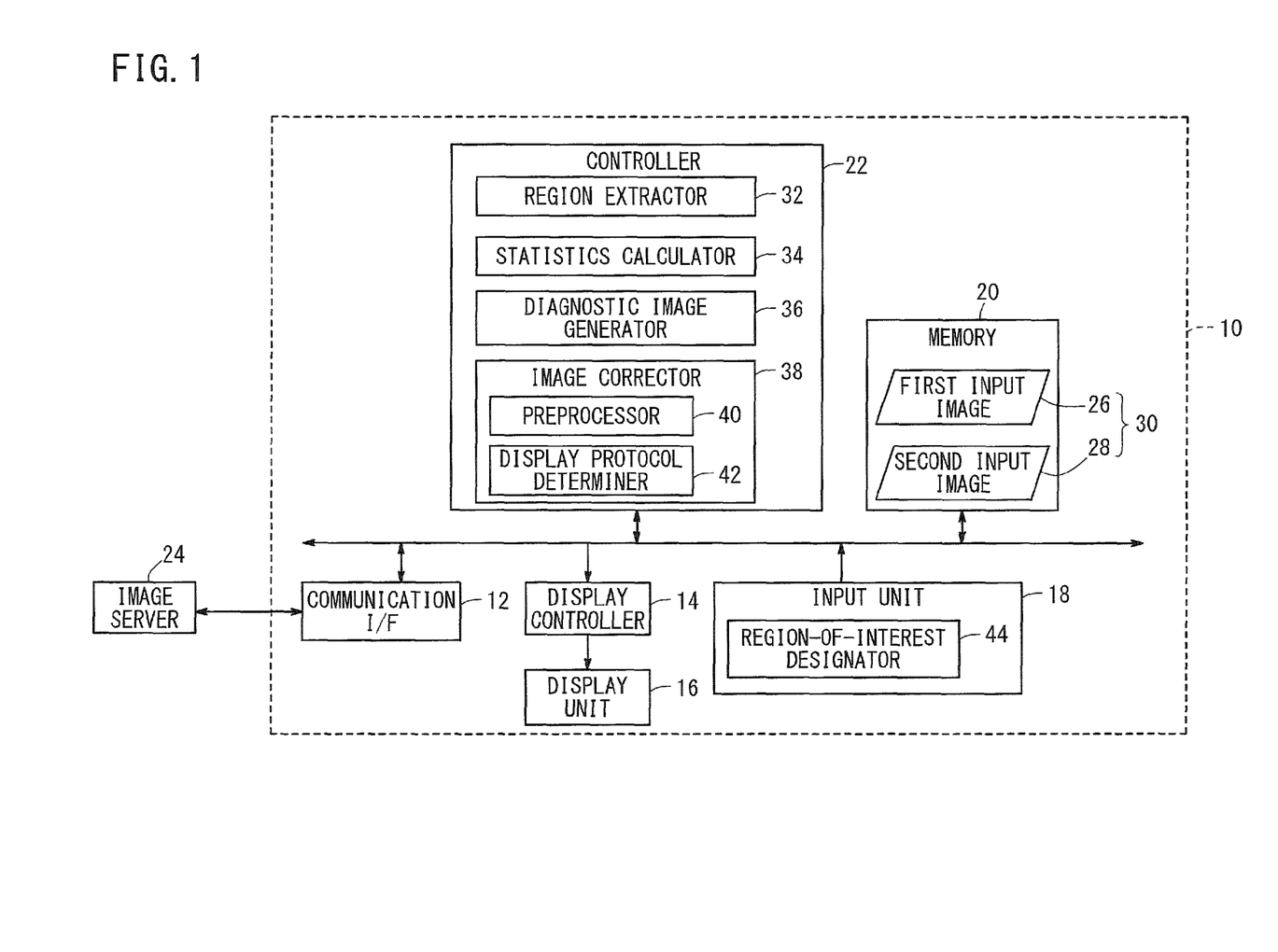
FIG. 1 is an electric block diagram of an image processing apparatus according to an embodiment of the present invention.

FIG. 1 is an electric block diagram of an image processing apparatus 10 according to an embodiment of the present invention. As shown in FIG. 1, the image processing apparatus 10 comprises a computer which includes a communication I/F (InterFace) 12, a display controller 14, a display unit 16, an input unit 18, a memory (storage medium) 20, and a controller 22.

The communication I/F 12 is an interface for receiving electric signals from and sending electric signals to an external apparatus. For example, the image processing apparatus 10 acquires medical images that are saved and managed by an image server 24, through the communication I/F 12. The medical images may be either two-dimensional images or three-dimensional images, and may include radiographic images (plain radiographic images), X-ray CT (Computed Tomography) images, MRI (Magnetic Resonance Imaging) images, US (UltraSound) images, PET (Positron Emission Tomography) images, or the like.

In the following descriptions, the minimum constituent unit of a two-dimensional image will be referred to as "a pixel", and a value that such a pixel has will be referred to as "a pixel value". Further, the minimum constituent unit of a three-dimensional image will be referred to as "a voxel", and a value that such a voxel has will be referred to as "a voxel value". Still further, the pixel value and the voxel value will be collectively referred to as "an image value".

The display controller 14 is a control circuit for controlling the display unit 16 under the control of the controller 22. More specifically, the display controller 14 outputs a display control signal via an I/F, not shown, to the display unit 16 to energize the display unit 16 to display various images including a window 100 (see FIG. 7).

The memory 20 stores therein programs, data, etc. required to control various components of the image processing apparatus 10. The memory 20 may comprise a computer-readable non-transitory storage medium such as a nonvolatile memory, a hard disk, or the like. In FIG. 1, the memory 20 stores, in addition to the programs and data, images including a first input image 26 and a second input image 28. A plurality of images (in FIG. 1, two images, i.e., the first input image 26 and the second input image 28) of the same subject are captured at different times and stored in the memory 20. These images are collectively referred to as a temporal image group 30.

The controller 22 comprises an information processor such as a CPU (Central Processing Unit) or the like. The controller 22 reads and executes programs stored in the memory 20, thereby functioning as a region extractor 32, a statistics calculator 34, a diagnostic image generator 36, and an image corrector 38.

The region extractor 32 extracts a foreground region 64 and a background region 60 (see FIG. 4B) from the first input image 26, etc. Generally, the foreground region 64 and the background region 60 are relatively positioned such that the foreground region 64 is surrounded by the background region 60 and does not overlap the background region 60. For example, in a medical image, the foreground region 64 corresponds to a lesion (more specifically a liver tumor, a plaque, or the like), and the background region 60 corresponds to a tissue (more specifically a liver, a blood vessel, or the like).

The statistics calculator 34 calculates a statistic with respect to a distribution of pixel values in each of the image regions that are extracted by the region extractor 32. The statistic is a quantity calculated according to a statistical process, and may be any one of a mean value, a mode value, a median value, a maximum value, and a minimum value, for example. If the image region that is extracted by the region extractor 32 is the foreground region 64, then the statistics calculator 34 calculates a foreground statistic Vf as a statistic. If the image region that is extracted by the region extractor 32 is the background region 60, then the statistics calculator 34 calculates a background statistic Vb as a statistic.

The diagnostic image generator 36 generates a diagnostic image for use in a diagnosis by performing a desired image processing process on the temporal image group 30. The image processing process may include various processes for making the differences between input images visual and emphasizing the differences, such as a gradation process, a spatial frequency modulating process, a noise removing process, a subtraction process, etc. If necessary, the diagnostic image generator 36 may perform a process for measuring dimensions and shapes or a CAD (Computer-Assisted Diagnosing/Detecting) process.

The image corrector 38 corrects pixel values of the temporal image group 30 based on statistics that are produced by subjecting the first input image 26 and the second input image 28 sequentially to processes by the region extractor 32 and the statistics calculator 34. More specifically, the image corrector 38 functions as a preprocessor 40 for preprocessing the temporal image group 30 before the diagnostic image generator 36 generates a diagnostic image, or a display protocol determiner 42 for determining a display protocol for the temporal image group 30 after the diagnostic image generator 36 has generated a diagnostic image.

The input unit 18 comprises various input devices including a mouse, a trackball, a keyboard, etc. The input unit 18 functions as a region-of-interest designator 44 for designating a region of interest 54 (see FIG. 4A) including at least a tumor region 52 (see ditto) in the first input image 26.

[Operation of Image Processing Apparatus 10]

The image processing apparatus 10 according to the present embodiment is configured as described above. Operation of the image processing apparatus 10 will be described in detail below with reference to a flowchart shown in FIG. 2. The following descriptions will be focused on examples of application with respect to two-dimensional images. However, it goes without saying that the present invention is also applicable to three-dimensional images.

Figure 2:
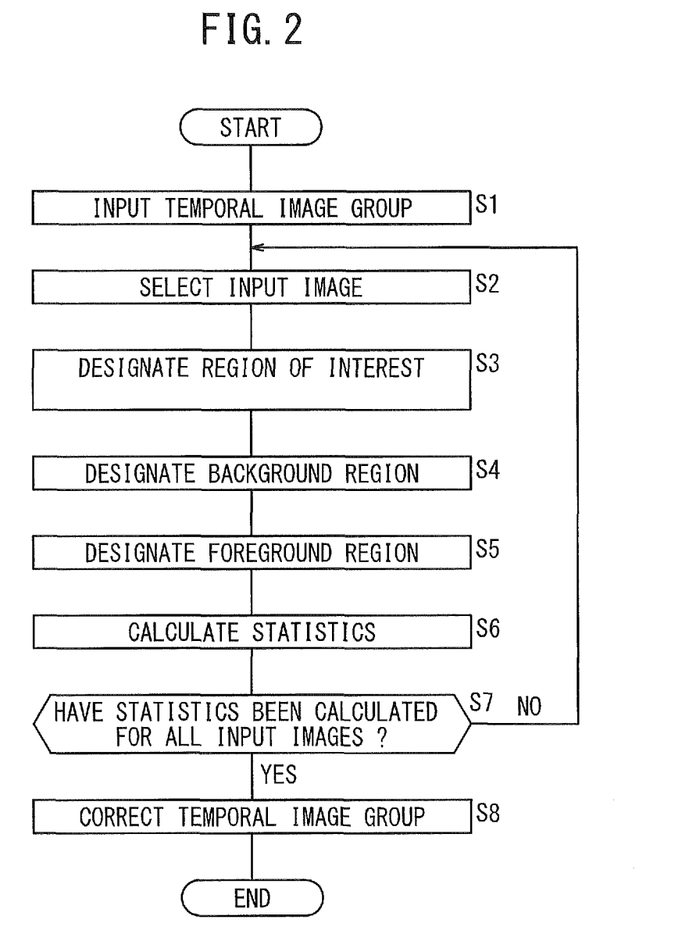
FIG. 2 is a flowchart of an operation sequence of the image processing apparatus shown in FIG. 1.

In step S1 shown in FIG. 2, the image processing apparatus 10 inputs thereinto a temporal image group 30 via the communication I/F 12. More specifically, the image processing apparatus 10 acquires a temporal image group 30 which includes a plurality of medical images of the same subject, the images being saved and managed by the image server 24. The controller 22 temporarily stores the acquired temporal image group 30 in the memory 20.

In step S2, the controller 22 selects one input image to be processed from the temporal image group 30 input in step S1. In the present flowchart, it is assumed that the controller 22 selects an input image that has not been selected in the present operation sequence, e.g., the first input image 26.

Figure 3A:
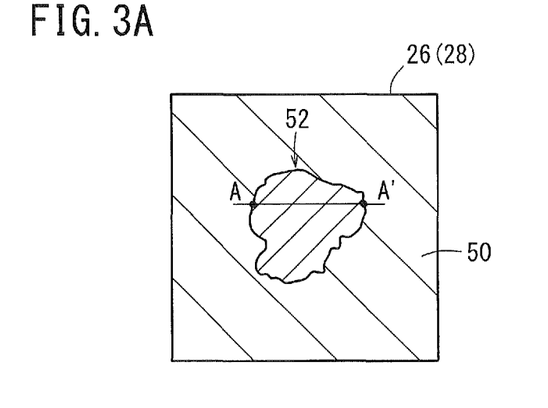
FIG. 3A is a diagram showing a visual first input image including a liver tumor.

FIG. 3A is a diagram showing a visual first input image 26 including a liver tumor. The first input image 26 shows a liver region 50 as a projected image of the liver of the subject and a tumor region 52 as a projected image of the liver tumor.

Figure 3B:
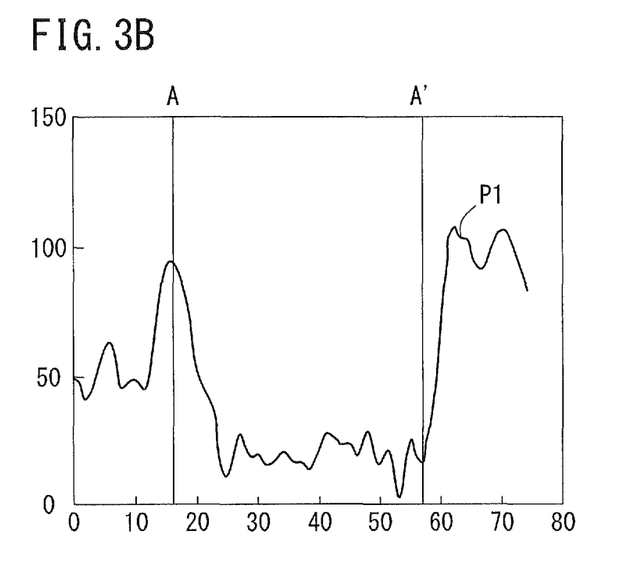
FIG. 3B is a diagram showing a luminance profile taken along line A-A' of FIG. 3A.

FIG. 3B is a diagram showing a luminance profile P1 taken along line A-A' of FIG. 3A. In FIG. 3B, A, A' represent points on the contour of the liver tumor. As shown in FIG. 3B, the liver region 50 has a relatively high luminance level, whereas the tumor region 52 has a relatively low luminance level. The doctor or technician as the user of the image processing apparatus 10 pays attention to the liver tumor, and observes the shape changes of the tumor region 52 over time.

In step S3, the region-of-interest designator 44 designates a region of interest 54 including at least the tumor region 52 from within the first input image 26. A processing of designating a region of interest 54 based on a user interface technology using the display unit 16 will be described below.

Figure 4A:
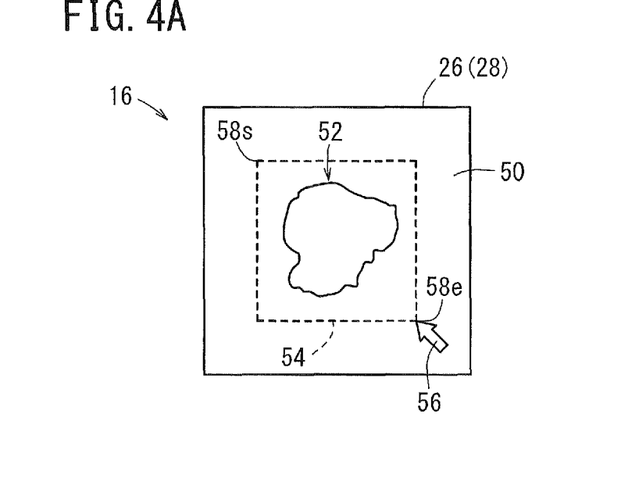
FIG. 4A is a diagram showing a process of designating a region of interest from the first input image shown in FIG. 3A.

As shown in FIG. 4A, a cursor 56, which is movable in response to the input unit 18 being operated by the user, is displayed and superimposed on the first input image 26 that is displayed on the display unit 16 (see FIG. 1). If the cursor 56 is dragged from a start point 58s to an end point 58e by the user, the region-of-interest designator 44 designates a rectangular region of interest 54, indicated by the broken line, with the start point 58s and the end point 58e at respective corners thereof.

The region of interest 54 may not be designated according to the above process, but may be designated according to any of various other processes. For example, the region of interest 54 may be of a circular shape, an elliptical shape, a polygonal shape, or the like, besides a rectangular shape. More specifically, the region-of-interest designator 44 may designate an elliptical region of interest 54, for example, having a major or minor axis as a line segment that interconnects the start point 58s and the end point 58e. Alternatively, the region of interest 54 may be designated manually by the user according to an annotation function, for example, to trace the boundary of the tumor region 52.

In step S4, the region extractor 32 extracts a background region 60 which corresponds to a portion of the liver region 50 from within the first input image 26 based on the region of interest 54 that has been designated in step S3.

Figure 4B:
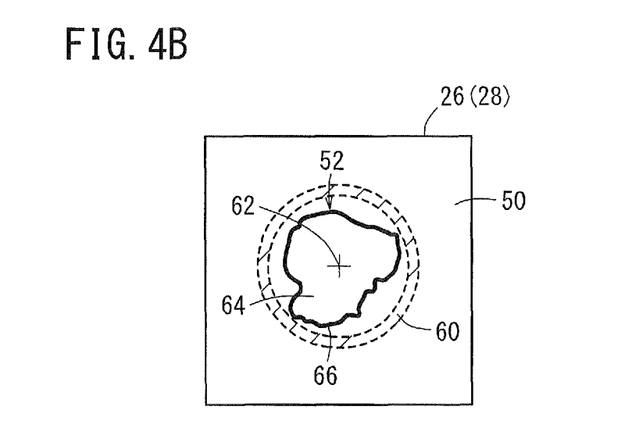
FIG. 4B is a diagram showing a process of extracting a foreground region and a background region from the first input image shown in FIG. 3A.

As shown in FIG. 4B, prior to extracting a background region 60, the region extractor 32 determines a reference position 62 (i.e., a position indicated by a crisscross mark) within the tumor region 52. The reference position 62 may be represented by the center of gravity of the region of interest 54 (see FIG. 4A) or the center of gravity of the tumor region 52 which has been provisionally determined according to a known image processing process.

The region extractor 32 then extracts an annular region around the reference position 62 as a background region 60. The background region 60 should preferably be sufficiently close to the tumor region 52, but not overlap the tumor region 52. Since the region extractor 32 extracts an annular region surrounding a foreground region 64 (tumor region 52), i.e., an isotropically-shaped background region 60, the background region 60 is of a constant shape regardless of the anisotropy and orientation of the tumor region 52. The background region 60 which is thus of a constant shape allows the background statistic Vb to be calculated stably, as described later.

In step S5, the region extractor 32 extracts a foreground region 64 corresponding to the tumor region 52 from within the first input image 26 based on its relationship to the background region 60 extracted in step S4. It is assumed that the region extractor 32 extracts a closed region surrounded by a contour 66 indicated by the thick line as a foreground region 64.

Various conventional algorithms are applicable as a process of determining a contour to extract a foreground region 64. For example, the region extractor 32 may extract a foreground region 64 by successively performing a binarizing process and a labeling process on the region of interest 54 which includes the tumor region 52. Alternatively, an evaluation function with an input value represented by "luminance profile P1" and an output value by "information as to whether a pixel belongs to a contour 66 or not" may be generated by a machine learning process, and the evaluation function may be applied to the first input image 26 that is actually acquired to determine a contour 66 of the tumor region 52 (for details, see Japanese Laid-Open Patent Publication No. 2007-307358).

In a case where the image values are voxel values, the region extractor 32 may extract the background region 60 (see step S4) and the foreground region 64 (see step S5) that are each a three-dimensional image region.

In step S6, the statistics calculator 34 calculates a statistic with respect to a distribution of pixel values in each image region from the background region 60 extracted in step S4 and the foreground region 64 extracted in step S5.

Figure 5A:
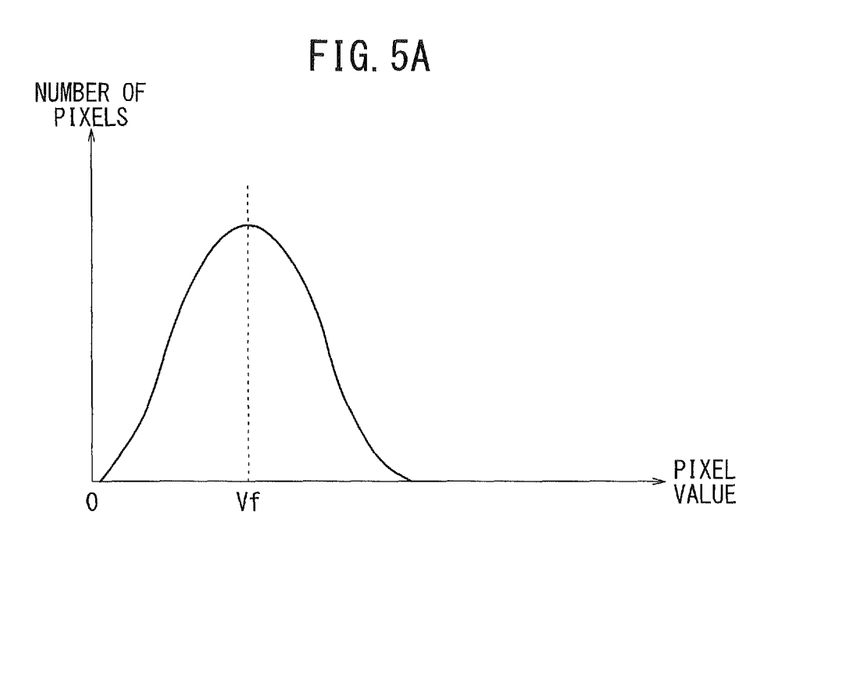
FIG. 5A is a diagram showing a histogram of pixel values in the foreground region shown in FIG. 4B.

FIG. 5A is a diagram showing a histogram of pixel values in the foreground region 64 shown in FIG. 4D. The histogram shown in FIG. 5A represents a distribution of pixel values with a peak pixel count at a pixel value Vf. The statistics calculator 34 determines the value Vf, which is a mode value, as a foreground statistic.

Figure 5B:
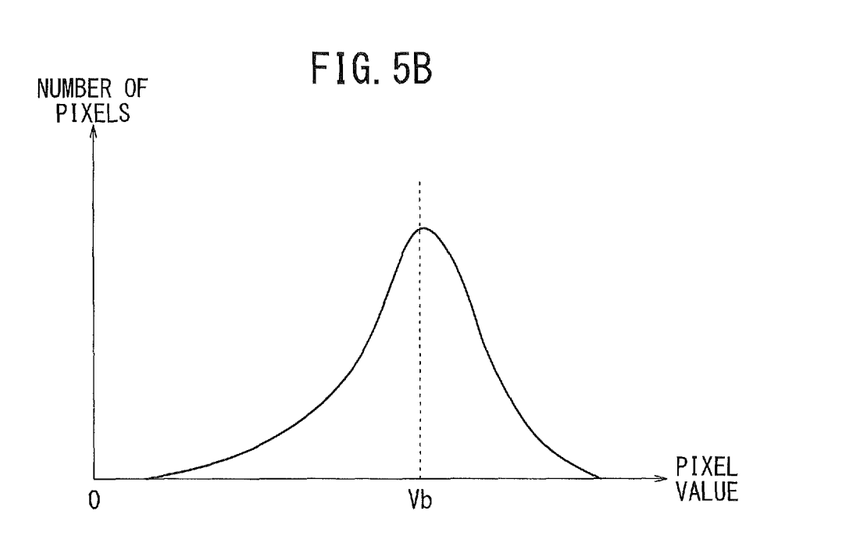
FIG. 5B is a diagram showing a histogram of pixel values in the background region shown in FIG. 4B.

FIG. 5B is a diagram showing a histogram of pixel values in the background region 60 shown in FIG. 4B. The histogram shown in FIG. 5B represents a distribution of pixel values with a peak pixel count at a pixel value Vb. The statistics calculator 34 determines the value Vb, which is a mode value, as a background statistic.

The statistics calculator 34 calculates a statistic according to a common rule, e.g., a mode value, independently of the attribute of the region. However, the statistics calculator 34 may calculate a different statistic depending on the attribute of the region, i.e., either the foreground region 64 or the background region 60. The statistic may be a typical or representative value, and may be any one of a mean value, a median value, a maximum value, and a minimum value, other than a mode value.

In step S7, the controller 22 judges whether the statistics calculator 34 has calculated statistics (i.e., the foreground statistics Vf and the background statistics Vb) of all the input images. If the controller 22 decides that the statistics calculator 34 has not calculated statistics of all the input images (S7: NO), then control goes back to step S2, and successively repeats steps S3 through S6 with respect to an input image which has not been selected. In other words, the controller 22 processes the second input image 28 in the same manner as the first input image 26.

In repeated step S3, the region-of-interest designator 44 designates a region of interest 54 including at least an area (hereinafter referred to as "common area") common to the temporal image group 30. According to the present embodiment, the region-of-interest designator 44 designates, as a region of interest 54, a corresponding region in the second input image 28 in relation to the designated region in the first input image 26.

In repeated steps S4, S5, the region extractor 32 extracts a background region 60 surrounding the tumor region 52 and a foreground region 64 surrounded by the contour 66, from within the second input image 28. Stated otherwise, the region extractor 32 extracts a background region 60 and a foreground region 64 from within a common area that is commonly included in the temporal image group 30.

If the controller 22 decides that the statistics calculator 34 has calculated statistics of all the input images (S7: YES), then control goes to step S8. It is assumed that the foreground statistic Vf calculated from the first input image 26 has a value Vf1, the background statistic Vb calculated from the first input image 26 has a value Vb1, the foreground statistic Vf calculated from the second input image 28 has a value Vf2, and the background statistic Vb calculated from the second input image 28 has a value Vb2.

APPLICATION EXAMPLES

An application of the image processing method according to the present embodiment will be described below with reference to FIGS. 6 and 7. Captured images of one area of one subject are identical to each other in principle. In this case, the equalities Vf1=Vf2 and Vb1=Vb2 hold.

However, in a case where images are captured using a contrast agent, the contrast of the captured images tends to vary depending on the time that has passed after the contrast agent was introduced. Therefore, the first input image 26 and the second input image 28 that are captured using a contrast agent tend to look different from each other.

In step S8 shown in FIG. 2, the image corrector 38 corrects the pixel values of the temporal image group 30 based on the foreground statistics Vf (which have values Vf1, Vf2) and the background statistics Vb (which have values Vb1, Vb2) successively calculated in step S6. In the present application examples, a process is carried out to match an input image having a higher contrast level to an input image having a lower contrast level. Two application examples will be described below.

First Application Example

According to a first application example, the image corrector 38 (i.e., the preprocessor 40) preprocesses at least one input image of the temporal image group 30 thereby to correct the pixel values of the images included in the temporal image group 30. It is assumed in the first application example that the contrast at a given area is defined as |Vb−Vf|, however it may alternatively be defined as |(Vb−Vf)/(Vb+Vf)|, for example.

If |Vb1−Vf1|≥|Vb2−Vf2| is satisfied, then the preprocessor 40 performs a gradation process for matching the contrast of the first input image 26 to the contrast of the second input image 28. More specifically, the preprocessor 40 corrects a pixel value Vorg of all or some pixels of the first input image 26 into a pixel value Vnew according to the following expression (1):

$$V\text{new}=Vf2+(V\text{org}-Vf1)\times(Vb2-Vf2)/(Vb1-Vf1) \quad (1).$$

If |Vb1−Vf1|<|Vb2−Vf2| is satisfied, then the preprocessor 40 performs a gradation process for matching the contrast of the second input image 28 to the contrast of the first input image 26. More specifically, the preprocessor 40 corrects a pixel value Vorg of all or some pixels of the second input image 28 into a pixel value Vnew according to the following expression (2):

$$V\text{new}=Vf1+(V\text{org}-Vf2)\times(Vb1-Vf1)/(Vb2-Vf2) \quad (2).$$

Figure 6:
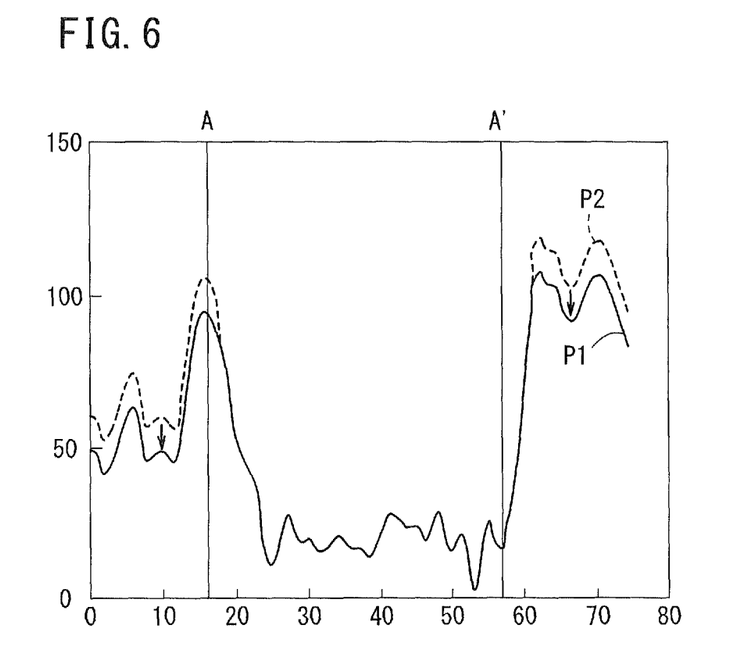
FIG. 6 is a diagram showing a luminance profile in a temporal image group.

FIG. 6 is a diagram showing luminance profiles of the temporal image group 30. In FIG. 6, the solid-line curve P1 represents the luminance profile of the first input image 26 (see FIG. 3B), and the broken-line curve P2 represents the luminance profile of the second input image 28.

Since |Vb1−Vf1|<|Vb2−Vf2| is satisfied in FIG. 6, the preprocessor 40 performs a gradation process for matching the contrast of the second input image 28 to the contrast of the first input image 26. As a result, the luminance profile P2 approaches the luminance profile P1. Stated otherwise, the standard deviation with respect to a distribution of differences of the pixel values between the images included in the temporal image group 30 is reduced after the pixel values have been corrected.

Thereafter, the diagnostic image generator 36 performs a desired image processing process on the temporal image group 30 that has been preprocessed by the preprocessor 40, thereby generating a diagnostic image. Since the contrast levels of the input images have been adjusted appropriately, the effects of various image processing processes for extracting and emphasizing the difference between the input images are highly increased.

Second Application Example

According to a second application example, the image corrector 38 (i.e., the display protocol determiner 42) determines a display protocol for at least one input image of the temporal image group 30 thereby to correct the pixel values of the images included in the temporal image group 30. The display protocol refers to display conditions including a color template, parameters of gradation and emphasizing processes, a window width (hereinafter referred to as "WW"), a window level (hereinafter referred to as "WL"), and a display sequence.

If $|Vb1-Vf1| \geq |Vb2-Vf2|$ is satisfied, then the display protocol determiner 42 determines a display protocol (WW/WL) for matching the contrast of the first input image 26 to the contrast of the second input image 28. More specifically, the display protocol determiner 42 corrects WW2 depending on the second input image 28 to determine WW1 depending on the first input image 26 according to the following expression (3):

$$WW1 = WW2 \times (Vb2-Vf2)/(Vb1-Vf1) \qquad (3).$$

The display protocol determiner 42 also corrects WL2 depending on the second input image 28 to determine WL1 depending on the first input image 26 according to the following expression (4):

$$WL1 = WL2 - Vf2 + Vf1 \qquad (4).$$

If $|Vb1-Vf1| < |Vb2-Vf2|$ is satisfied, then the display protocol determiner 42 determines a display protocol (WW/WL) for matching the contrast of the second input image 28 to the contrast of the first input image 26. More specifically, the display protocol determiner 42 corrects WW1 depending on the first input image 26 to determine WW2 depending on the second input image 28 according to the following expression (5):

$$WW2 = WW1 \times (Vb1-Vf1)/(Vb2-Vf2) \qquad (5).$$

The display protocol determiner 42 also corrects WL1 depending on the first input image 26 to determine WL2 depending on the second input image 28 according to the following expression (6):

$$WL2 = WL1 - Vf1 + Vf2 \qquad (4).$$

Thereafter, the controller 22 generates display data using the diagnostic image generated by the diagnostic image generator 36 and the display protocol (WW/WL) determined by the display protocol determiner 42, and then supplies the generated display data to the display controller 14. The display controller 14 displays a window 100 (see FIG. 7) on the display unit 16 based on the supplied display data.

Figure 7:
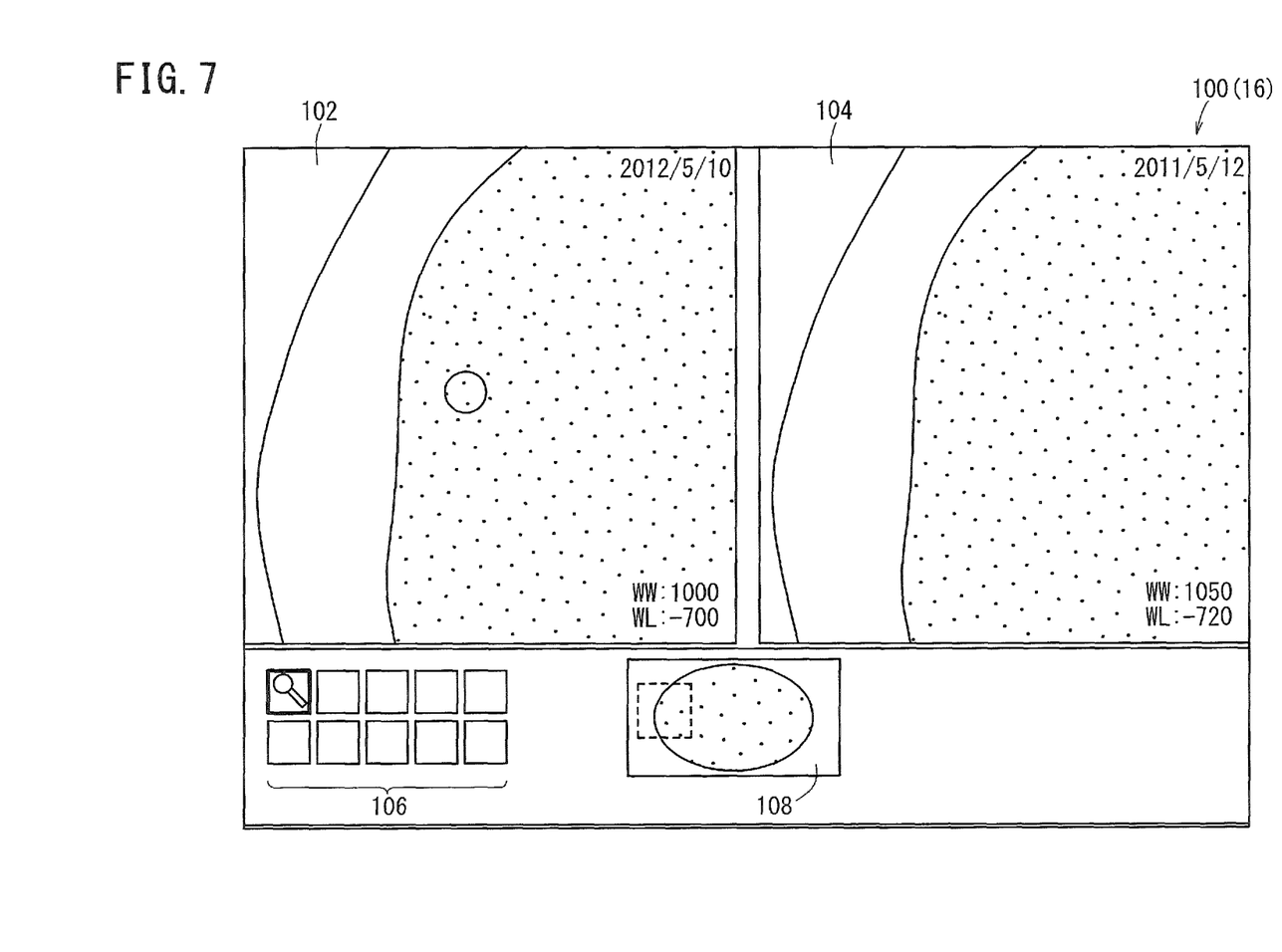
FIG. 7 is a view showing a manner in which a temporal image group is displayed for comparison.

FIG. 7 is a view showing a manner in which the temporal image group 30 is displayed for comparison. As shown in FIG. 7, the window 100 includes two display frames, i.e., left and right display frames 102, 104. The left display frame 102 displays the latest image, e.g., the first input image 26, whereas the right display frame 104 displays an image about one year ago, e.g., the second input image 28. The window 100 also includes a plurality of tool icons 106 and a thumbnail image 108 below the display frames 102, 104. The tool icons 106 are icons for changing the manner in which the display frames 102, 104 are displayed. The thumbnail image 108 is an image representing the positional relationship between the display range of the first input image 26 in its entirety and the display range of the display frames 102, 104.

The doctor or technician can interpret the present image and the past image that are being displayed in juxtaposition on the display unit 16 while comparing them with each other. Since the contrast levels of the displayed images have been adjusted appropriately, the image processing apparatus 10 provides the user with a highly increased diagnostic capability.

In each of the application examples described above, an input image with a higher contrast level is matched to an input image with a lower contrast level. However, an input image with a lower contrast level may be matched to an input image with a higher contrast level. Alternatively, the higher and lower contrast levels of input images may be adjusted to a desired intermediate level (e.g., an average level) between the higher and lower contrast levels. The same may apply to a case where the contrast levels of three or more input images are adjusted.

As described above, the image processing apparatus 10 according to the present invention includes the statistics calculator 34 that calculates a foreground statistic Vf with respect to a distribution of image values in the foreground region 64 and a background statistic Vb with respect to a distribution of image values in the background region 60, and the image corrector 38 that corrects image values of the images included in the temporal image group 30 based on foreground statistics Vf and background statistics Vb which are calculated with respect to a plurality of input images (temporal image group 30) which are captured at different times. Thus, the image processing apparatus 10 makes it possible to easily adjust how a plurality of input images of the temporal image group 30 that are captured at different times look without the need for the preparation of data for adjusting density distributions for each image processing condition.

Particularly, since the standard deviation with respect to a distribution of differences of the image values between the images included in the temporal image group 30 is reduced after the image values have been corrected, the input images of the temporal image group 30 can be made to look and appear in the same manner to each other.

The present invention is not limited to the embodiment described above, but various changes and modifications may be made thereto without departing from the scope of the invention. For example, the processing sequences of the first and second application examples described above may be combined with each other. Although the image processing method according to the present invention has been illustrated as being applied to medical images, it is also applicable to other images than medical images.

What is claimed is:

1. An image processing apparatus comprising:
   a region extractor for extracting a foreground region and a background region that do not overlap each other, from within each input image of a plurality of input images captured at different times;
   a statistics calculator for calculating a foreground statistic, which is a statistic with respect to a distribution of image values in the foreground region extracted by the region extractor, and a background statistic, which is a statistic with respect to a distribution of image values in the background region extracted by the region extractor; and
   an image corrector for correcting image values of the plurality of input images based on the foreground statistics and the background statistics which are obtained by processing the input images sequentially with the region extractor and the statistics calculator.

2. The image processing apparatus according to claim 1, wherein the image corrector corrects image values of the input images such that the standard deviation with respect to a distribution of differences of the image values between the input images is reduced after the image values have been corrected.

3. The image processing apparatus according to claim 1, wherein the image corrector corrects image values of the input images by preprocessing at least one of the input images.

4. The image processing apparatus according to claim 1, wherein the image corrector corrects image values of the input images by determining a display protocol for at least one of the input images.

5. The image processing apparatus according to claim 1, wherein the region extractor extracts the foreground region and the background region from a common area which is commonly included in the input images.

6. The image processing apparatus according to claim 1, wherein the region extractor extracts an annular region surrounding the foreground region as the background region.

7. The image processing apparatus according to claim 1, wherein the statistics calculator calculates a statistic which represents any one of a mean value, a mode value, a median value, a maximum value, and a minimum value, as at least one of the foreground statistic and the background statistic.

8. The image processing apparatus according to claim 1, wherein the image values each comprise a voxel value; and
the image extractor extracts the foreground region and the background region that are each a three-dimensional image region.

9. An image processing method for enabling an image processing apparatus to perform:
an extracting step of extracting a foreground region and a background region that do not overlap each other, from within each input image of a plurality of input images captured at different times;
a calculating step of calculating a foreground statistic, which is a statistic with respect to a distribution of image values in the extracted foreground region, and a background statistic, which is a statistic with respect to a distribution of image values in the extracted background region; and
a correcting step of correcting image values of the plurality of input images based on the foreground statistics and the background statistics which are obtained by subjecting the input images sequentially to the extracting step and the calculating step.

10. A non-transitory storage medium storing therein a program for enabling an image processing apparatus to perform:
an extracting step of extracting a foreground region and a background region that do not overlap each other, from within each input image of a plurality of input images captured at different times;
a calculating step of calculating a foreground statistic, which is a statistic with respect to a distribution of image values in the extracted foreground region, and a background statistic, which is a statistic with respect to a distribution of image values in the extracted background region; and
a correcting step of correcting image values of the plurality of input images based on the foreground statistics and the background statistics which are obtained by subjecting the input images sequentially to the extracting step and the calculating step.

11. The image processing apparatus according to claim 1, wherein the image corrector corrects a difference of image values between the input images by adjusting contrast of at least one of the input images based on the foreground statistic and the background statistic.

12. The image processing apparatus according to claim 4, wherein the display protocol includes at least one of a color template, a parameter of a gradation process, a parameter of an emphasizing process, a window width, a window level, and a display sequence.

13. The image processing apparatus according to claim 7, wherein the image corrector corrects a difference of image values between the input images by adjusting contrast of at least one of the input images based on the foreground statistic and the background statistic.

14. The image processing method according to claim 9, wherein the correcting step further corrects a difference of image values between the input images by adjusting contrast of at least one of the input images based on the foreground statistic and the background statistic.

15. The image processing method according to claim 9, wherein the correcting step further corrects image values of the input images by determining a display protocol for at least one of the input images, and
wherein the display protocol includes at least one of a color template, a parameter of a gradation process, a parameter of an emphasizing process, a window width, a window level, and a display sequence.

16. The image processing method according to claim 9, wherein the calculating step further calculates a statistic which represents any one of a mean value, a mode value, a median value, a maximum value, and a minimum value, as at least one of the foreground statistic and the background statistic, and
wherein the correcting step further corrects a difference of image values between the input images by adjusting contrast of at least one of the input images based on the foreground statistic and the background statistic.

17. The non-transitory storage medium according to claim 10, wherein the correcting step further corrects a difference of image values between the input images by adjusting contrast of at least one of the input images based on the foreground statistic and the background statistic.

18. The non-transitory storage medium according to claim 10, wherein the correcting step further corrects image values of the input images by determining a display protocol for at least one of the input images, and
wherein the display protocol includes at least one of a color template, a parameter of a gradation process, a parameter of an emphasizing process, a window width, a window level, and a display sequence.

19. The non-transitory storage medium according to claim 10, wherein the calculating step further calculates a statistic which represents any one of a mean value, a mode value, a median value, a maximum value, and a minimum value, as at least one of the foreground statistic and the background statistic, and
wherein the correcting step further corrects a difference of image values between the input images by adjusting contrast of at least one of the input images based on the foreground statistic and the background statistic.

* * * * *